March 4, 1958 R. A. FRYKLUND 2,825,884
ECHO RANGING DEVICES
Filed May 14, 1953 5 Sheets-Sheet 1

INVENTOR
ROBERT A. FRYKLUND
BY Elmer J. Gorn
ATTORNEY

March 4, 1958 — R. A. FRYKLUND — 2,825,884
ECHO RANGING DEVICES
Filed May 14, 1953 — 5 Sheets-Sheet 2

INVENTOR
ROBERT A. FRYKLUND
BY Elmer J. Gorn
ATTORNEY

March 4, 1958     R. A. FRYKLUND     2,825,884
ECHO RANGING DEVICES
Filed May 14, 1953     5 Sheets-Sheet 3

INVENTOR
ROBERT A. FRYKLUND
BY Elmer J. Gorn
ATTORNEY

INVENTOR
ROBERT A. FRYKLUND
BY Elmer J. Gwen
ATTORNEY

INVENTOR
ROBERT A. FRYKLUND
BY Elmer J. Gorn
ATTORNEY

United States Patent Office

2,825,884
Patented Mar. 4, 1958

2,825,884

ECHO RANGING DEVICES

Robert A. Fryklund, Dedham, Mass., assignor to Raytheon Manufacturing Company, Newton, Mass., a corporation of Delaware Application May 14, 1953, Serial No. 355,029

6 Claims. (Cl. 340—3)

This invention relates to echo ranging systems and more particularly to an underwater sound ranging system useful for searching a large portion of the volume of water beneath the vessel carrying the system and for indicating the results of the search in a presentation which gives three-dimensional information.

One of the important uses for underwater sound equipment in the commercial field is the location of schools of fish or objects on the bottom of the water body. Sonic devices of the well-known depth sounder type have been used for this purpose with good results. However, since the depth sounders have their sound transducers directed downwardly, the information obtained by these equipments is limited to objects positioned in the small substantially conical volume of water extending downwardly from the vessel with the apex substantially at the transducer. With such a system, the location of fish requires that the fish pass substantially under the vessel which, in turn, means that direction of the vessel is a more or less hit or miss proposition, since there is no way of ascertaining whether there are any fish in the general area in which the vessel is searching.

This invention discloses that a considerably larger volume of the water body beneath the vessel, and, indeed, substantial portions of the water body at either side of the vessel, may be searched by training the sound head to move the direction of the sonic pattern through a substantially vertical angle from a substantially horizontal direction on one side of the vessel down toward the bottom of the water body and up toward the substantially horizontal direction on the other side of the vessel.

This invention also discloses an indicator system which is particularly useful with a sonic search system whose sonic pattern trains through a vertical angle below the vessel. Briefly, the indicator comprises a record medium, a record producing element, such as a stylus, cylically drawn across the record medium along a predetermined substantially straight line path, and a structure for rotating the path of the stylus with respect to the record medium about a predetermined point, the rotation of said path substantially corresponding to the rotation of the sonic pattern through the vertical angle beneath the vessel. The record medium is continuously moved away from the point of rotation of the path to continuously expose a new portion of the record medium. The motion of the record medium corresponds to the motion of the vessel through the water. In one modification of the invention, the record medium is drawn away from the point of rotation in a direction substantially perpendicular to the upper edge of the presentation which corresponds to the surface of the water body, while in another modification the record medium is moved away from the point of rotation of the stylus path in a direction at an angle to the perpendicular to the top of the presentation corresponding to the surface of the water body thereby producing a presentation similar to an isometric view of an object.

This invention further discloses a modification wherein the sound head projecting the sonic pattern into the water is stabilized to compensate for roll of the vessel such that the presentation on the indicator will not roll back and forth with the roll of the vessel. Briefly, this is accomplished by a differential gearing mechanism having a first input connected to a source of oscillatory motion for producing the desired search motion of the sound head and a second input connected to a drive motor operated in a feed-back system utilizing a stable vertical to cause said second input to move as a function of the roll of the vessel.

Other and further objects and advantages of this invention will be apparent as the description thereof progresses, reference being had to the accompanying drawings, wherein.

Figure 1:
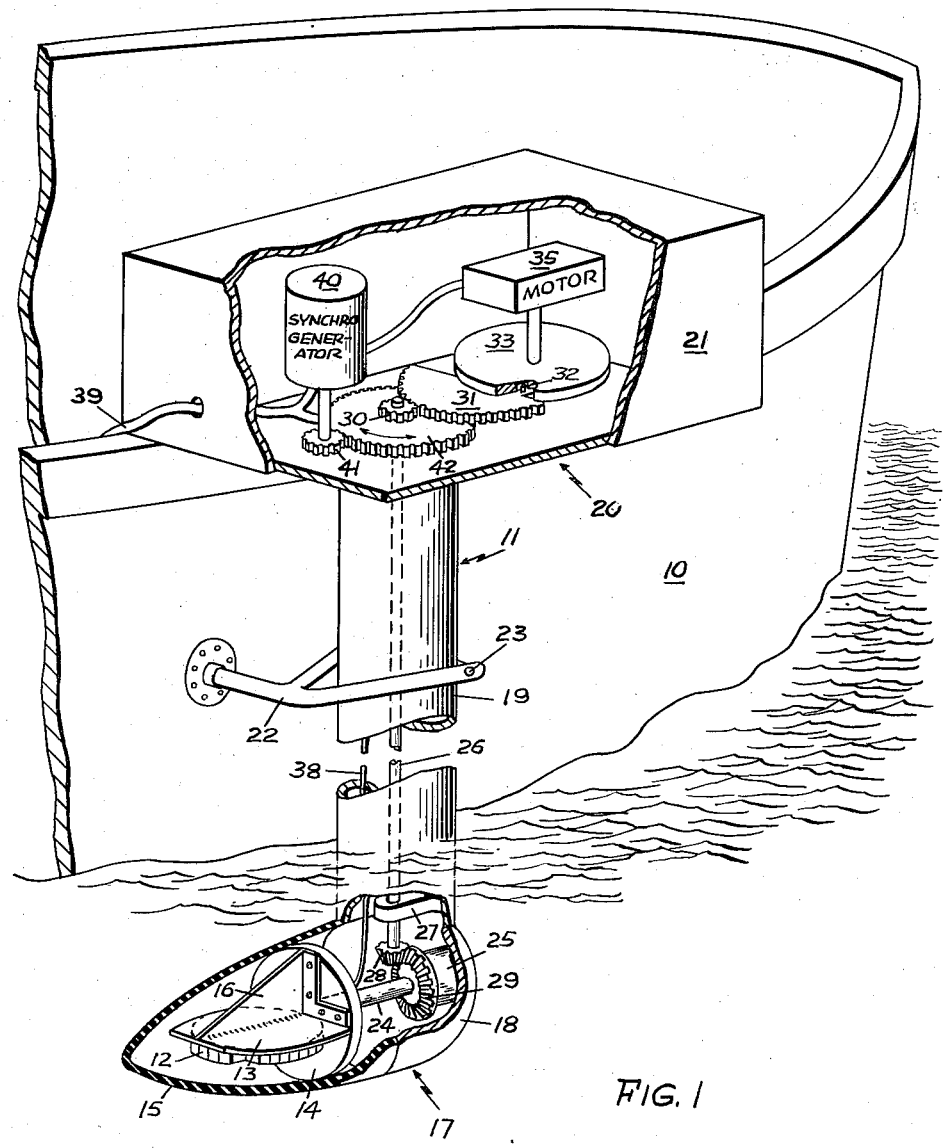
Fig. 1 illustrates a partially broken away isometric view of a vessel carrying the sound head and training system therefor.
Figure 2:
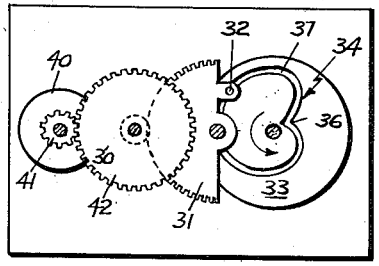
Fig. 2 illustrates a cross-sectional view of the device shown in Fig. 1 illustrating details of the cam assembly which imparts the oscillatory motion of the training mechanism.

Referring now to Figs. 1 and 2, there is shown a system for cyclically moving a sonic transducer through a vertical angle below the vessel. The vessel, illustrated at 10, has the transducer training structure 11 attached to the side thereof. As illustrated herein, the transducer proper indicated at 12, which may be any of the well-known transducers normally used in underwater sound, such as the crystal or magnetostriction types, is mounted on a support plate 13 and is shown here with the transducer 12 directed downwardly. Plate 13 is attached to a vertically oriented circular planar member 14, which is, in turn, attached to the housing 15 in which the transducer 12 is positioned. Plate 13 is stiffened with respect to plate 14 by means of a triangular-shaped member 16 attached to plates 13 and 14 substantially perpendicular thereto.

Housing 15 comprises the rear portion of a substantially teardrop-shaped structure 17 designed to move through the water with a relatively low drag. Housing 15 is made of a material having substantially the same impedance as water and may be, for example, a rubber or plastic structure. The forward part 18 of the teardrop-shaped structure 17 is made of metal, such as cast iron. A strut 19 is rigidly attached to portion 18 and extends upwardly out of the water to a mechanical transducer training drive assembly 20 positioned in a box 21, shown here as being mounted on the gunnel of the vessel 10. A support 22 is attached to the side of the boat in the region of the water line and comprises a forked member in which the strut 19 rests and into which strut 19 is urged as the vessel moves through the water. The strut 19 is retained in the fork-shaped support 22 by means of a removable bolt 23 extending through the ends of the forks of member 22.

The assembly 12 through 16 is rotatably joined to the member 18 by means of a shaft 24, one end of which is rigidly fastened to plate 14 and the other end of which engages a bearing block 25 rigidly attached to member 18. The joint between the front portion 18 and the rear portion 15 of the assembly 17 is loose to permit the assembly 12 to 16 to rotate relative to the structure 17 on a shaft 24 supported in bearings in member 17.

The acoustically transparent member 15 is attached to the circular member 14 by means which provide a hermetically sealed cavity. The cavity is filled with a suitable fluid, such as oil. Rotary motion is transmitted to the transducer 12 by means of a shaft 26 extending from the training drive assembly 20 downwardly through strut 19, which is hollow. Shaft 26 rides in a bearing 27 adjacent its lower end and has a bevel gear 28 rigidly attached to its lower end. Bevel gear 28 meshes with a bevel gear 29 rigidly attached to shaft 24.

Positioned inside box 21 are a series of gears and a cam assembly, together with the required motor and synchro generator necessary to produce the desired motion and tracking of the device. The bearings for the shafts of the various components have been omitted in order to more clearly illustrate the interrelation between the elements. As shown here, the upper end of shaft 26 is rigidly attached to a pinion gear 30 which meshes with a portion of a spur gear 31. The gear 31 may be a complete gear, if desired, but for the particular arrangement shown only a portion of the gear is utilized. Gear 31 has attached thereto a cam follower 32 which engages a cam groove cut in a cam disk 33. The outline of the cam groove, illustrated more clearly at 34 in Fig. 2, may be of any desired shape. However, as shown here, the contour of groove 34 is such that, when the cam 33 is rotated at a constant speed, for example, by a motor 35, the cam follower 32, starting from a point 36 closest to the center of rotation of cam 33, rotates slowly about the axis of gear 31 in a direction counter to the direction of rotation of cam 33 at a uniform rate for substantially three-quarters of a revolution of cam 33 until a point approximately at 37 is reached by the cam follower on cam groove 34, following which the cam follower 32 reverses its direction of rotation and returns to its starting point 36. This motion is transmitted by means of gears 31, 30, 28 and 29, and shafts 26 and 24 to the transducer 12, causing the transducer to rotate slowly from a position aimed abeam the boat downwardly toward the bottom of the water body and back up abeam the boat on the other side, following which the transducer is rotated rapidly back to its starting point. The total angle through which the transducer 12 rotates may be adjusted to any desired magnitude by selection of the gear ratios of gears 28 and 29 and gears 30 and 31. As illustrated herein, the total angle through which the transducer 12 rotates may be slightly less than 180 degrees, for example, on the order of 170 degrees. It is to be clearly understood that other shapes of cams may be used for the cam 33 producing, for example, a sinusoidal scan, or the transducer 12 could be rotated through 360 degrees at constant speed. However, with the latter scan, use of the transducer 12 would be lost for approximately half the time. The transducer 12 is connected to the remainder of the equipment by means of a cable 38 extending through strut 19 into box 21 and out through a cable 39 to an indicator unit positioned elsewhere on the vessel 10. Power for motor 35 is obtained by means of wires fed into box 21 through cable 39.

The motion of the transducer 12 is fed to the indicator by means of a synchro system comprising a synchro generator 40 whose shaft has a pinion gear 41 attached thereto. The pinion gear 41 meshes with a spur gear 42 rigidly attached to shaft 26 such that, as the shaft 26 is rotated by transducer 12, the motion of shaft 26 causes rotation of synchro generator 40, thereby transmitting the required relative phase information, of the alternating current energizing synchro generator 40, to the indicator.

Figure 3:
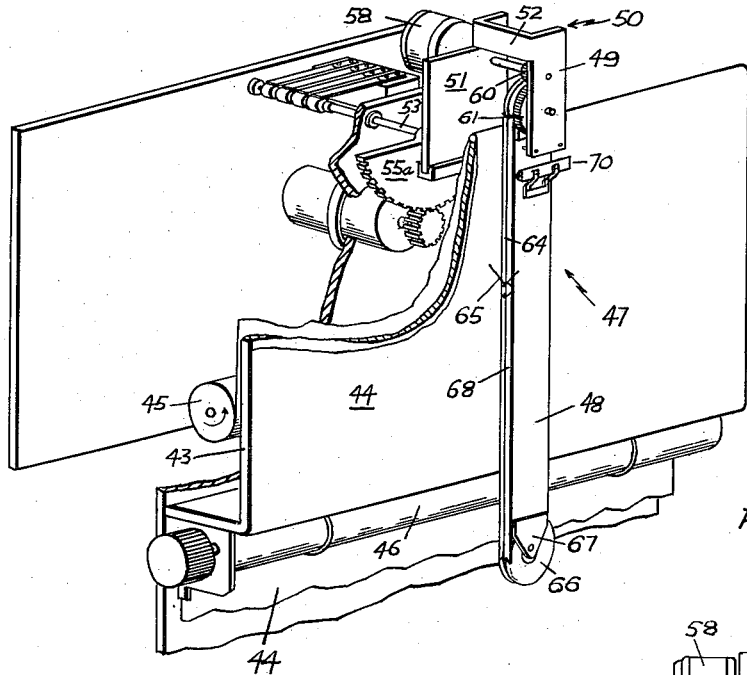
Fig. 3 illustrates a partially broken away isometric view of an indicator embodying this invention.
Figure 4:
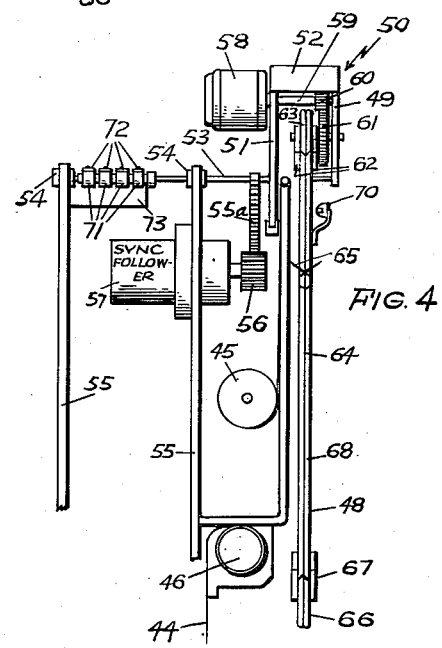
Fig. 4 illustrates a side elevation view of the indicator shown in Fig. 3.

Referring now to Figs. 3 and 4, there is illustrated the mechanical details of an indicator unit which may be used with the transducer training system illustrated in Figs. 1 and 2. The indicator unit has a platen 43 comprising a substantially planar metallic member across the front surface of which is drawn a record medium, which may be, for example, sensitized paper 44. The paper 44 moves from a storage roll 45 positioned in back of platen 43 up over the top of platen 43 and down across the front surface thereof substantially in contact therewith. After passing the lower edge of platen 43, the paper 44 moves over a drive roller 46 driven by a motor, not shown, which may be, for example, a synchronous motor of the clock-drive type. The details of storing the paper and drawing it down over the platen 43 are similar to those used to draw the sensitized paper across the platen in the invention disclosed in my copending application, Serial No. 326,906, filed December 19, 1952.

A stylus carrying assembly 47 is provided comprising an arm 48, which, as shown here, may be a substantially flat member positioned slightly in front of platen 43 parallel thereto and connected such that it rotates about a point approximately at the upper edge of platen 43 in the middle thereof. In order to mount arm 48 such that it pivots about a point at the upper edge of platen 43, arm 48 is bolted to a support member 49 by means of bolts which have spacers thereon which space arm 48 from member 49. Member 49 is a portion of a support bracket 50 having a portion 51 which is positioned in back of platen 43 and which is attached to portion 49 by means of a connecting portion 52.

Portion 51 is rigidly attached to a shaft 53 which extends back through bearings 54 in a pair of spaced vertical upright support plates 55 which are rigidly attached to the same chassis assembly as platen 43, although the specific details of this attachment are not shown. Shaft 53 is positioned perpendicular to platen 43 and extends behind platen 43 from adjacent the mid-point of the upper edge of platen 43. Rotation of shaft 53 is accomplished by means of a spur gear 55a rigidly attached thereto adjacent support portion 51. Spur gear 55a meshes with a pinion gear 56 driven by a synchro follower 57 mounted in the forward vertical support member 55. The three wires of the stator of synchro follower 57 are connected to the three wires of the stator of synchro generator 40 in Fig. 1, and armatures of synchro generator 40 and synchro follower 57 are connected to the same alternating current source, such that the angular position of the armature synchro generator 40 will be repeated or synchronized to the rotation of the pinion gear 56 driving the shaft 53. The gear ratios of the gears 55a and 56 and the gears 41 and 42 are adjusted such that the arm 48 extends in the same direction from its pivot point as the direction of the sonic pattern produced by the transducer 12; that is, when the transducer 12 has its pattern directed abeam the vessel, the arm 48 will be in a substantially horizontal position. As the transducer 12 is trained downwardly through a vertical angle, the arm 48 will move downwardly, coinciding with the movement of transducer 12, and will be vertical at the same time the transducer 12 has its pattern directed vertically downward.

In order to move a stylus along arm 48 to produce marks on the paper 44, there is provided a motor 58 mounted on the rear surface of support member 51 above shaft 53. The shaft 59 of motor 58 extends through support member 51 and support members 49, and has rigidly attached thereto a pinion gear 60 adjacent the back surface of member 49. Pinion gear 60 meshes with a spur gear 61 positioned below pinion gear 60 between arm 48 and support member 49. Gear 61 is rigidly attached by means of a shaft extending through support plates 62 attached to the upper end of arm 48 to an upper drive pulley 63 whose axis lies substantially on the longitudinal center line of arm 48. Pulley 63 lies in substantially the same plane as arm 48 and has a thickness and diameter substantially equal to the thickness and width, respectively, of arm 48. Pulley 63 contains a groove around which extends a string 64, attached to which is a stylus assembly 65. String 64 extends downwardly along one edge of arm 48 and around a grooved idler pulley 66 substantially similar to pulley 64 and supported below the lower end of arm 48 by means of support members 67 attached to the lower end of arm 48. String 64 then extends back up along the other edge of arm 48 and around the pulley 64. The stylus and string assembly are described in greater detail in my aforementioned copending application.

In order to allow maximum visibility of the pawer 44, the arm 48 may be made of transparent material, such as Plexiglas or Lucite. In this event, the guide grooves, described in my aforementioned copending application for the purpose of guiding the stylus, would be made of a metal strip 68 fastened to the edge of the arm 48. As illustrated herein, the stylus travels downwardly along the left-hand edge of the arm 48 to which is attached the metal guide member 68, and upwardly along the right-hand edge of arm 48. For this arrangement, the arm 48 would pivot about a point lying substantially on the left-hand edge of arm 48; that is, the axis of shaft 53 would intersect the arm 48 at its left-hand edge adjacent the upper edge of platen 43. The echo signals are applied to the metallic guide member 68 and thence through stylus 65 to the paper 44. If desired, a member similar to member 68 may be used on the right-hand edge of arm 48 to guide the stylus back up along the right-hand side. However, no electrical connections would be made to this guide member or the guide member could be grounded so that no marks would be made on the paper as the stylus is drawn back up along the right-hand edge of the arm 48. As illustrated herein, no guide member similar to member 68 is used on the right-hand edge of arm 48, since satisfactory operation may be obtained by merely letting the stylus move upwardly resting against the edge of arm 48.

In order to provide for keying the system to emit sonic impulses from the transducer as the stylus passes the upper edge of platen 43 on its downward traverse, there is provided a stationary keying contact 70 attached to the front surface of arm 48 adjacent the upper edge of platen 43 and insulated from the guide strips 68. Keying contact 70 is similar to that illustrated in greater detail in my aforementioned copending application. In order to provide electrical connections to the assembly carried by shaft 53, there are provided four slip rings 71 insulatingly mounted on shaft 53 and insulated from each other. Two of the slip rings are used to feed power to the motor 58, a third is connected to the guide track 68 to supply signals to the stylus 65, and the fourth is connected to the keying contact 70. Slip rings 71 are engaged, respectively, by four brushes 72 insulatingly mounted on a block 73 of insulating material and to which various leads may be connected for applying the desired electrical signals to the slip rings 71.

Figure 5:
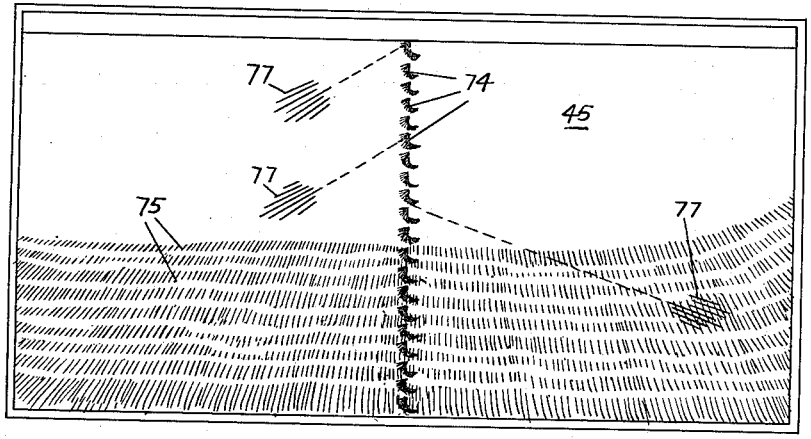
Fig. 5 illustrates the pattern produced on the record medium of the device shown in Fig. 3.

Referring now to Fig. 5, there is illustrated a typical presentation of signals which may be observed on the paper 14. The illustration in Fig. 5 is that which would be observed through a window in the case of an indicator exposing the paper 44, and the arm 48 would be pivoted about a point substantially at the upper edge of the paper 44 substantially in the middle of the upper side of the window. In the interests of clarity, the arm 48 and the stylus assembly have been omitted. The marks 74 extending downwardly along the middle of the paper 44 represent the zero trigger marks; that is, the marks produced when the transmitted pulse is sent out by the transducer, a portion of said pulse being fed back through the receiver to produce a mark on the indicator. The marks 75, which are fairly uniform, are indicative of the bottom of the water body being searched, while the marks 77, which have a different direction of orientation from the marks 75, represent objects above the bottom of the water body, these objects being, for example, schools of fish or other objects. The distance of the object, producing the echoes which made marks 75 or 77, from the vessel 10 at the time the echo signal was received is obtained by measuring the distance from the particular mark to the particular one of the zero marks 74 intersected by the linear extension of the particular echo mark. The vertical angle of the direction of the object producing the echo with respect to the perpendicular of the vessel is obtained by measuring the angle that the mark makes with a perpendicular or vertical line on the paper. The time elapsed since the echo signal was received, and hence the distance which the object producing the echo lies behind the vessel for a constant speed of the vessel, is proportional to the distance which a particular zero mark 74, corresponding to the transmitted pulse which produced the echo signal, lies below the upper edge of the paper. Thus it may be seen that three-dimensional information is presented on the paper, namely, vertical angle, radial distance along the angle, and distance behind the vessel. With practice, an observer may readily interpret this presentation into a volumetric presentation of the water body below and behind the vessel.

Figure 6:
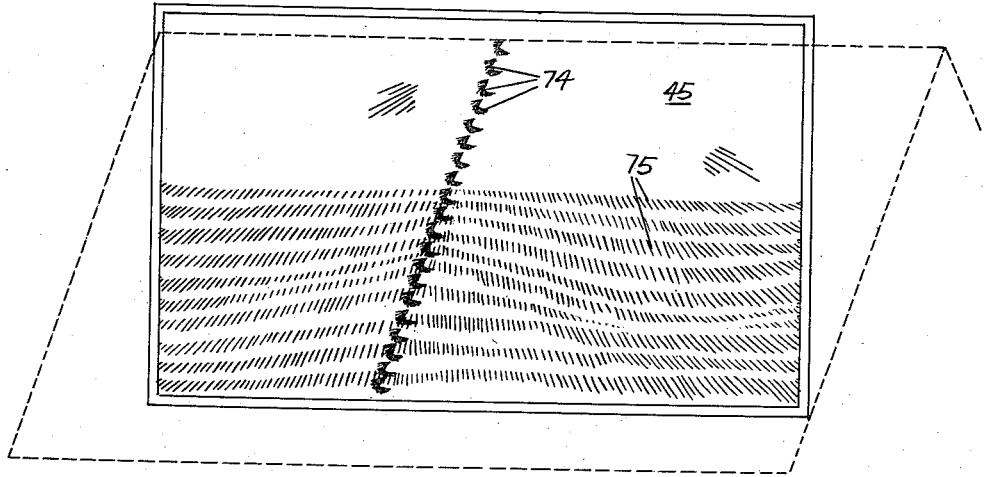
Fig. 6 illustrates a modification of the presentation of Fig. 5 wherein the record medium is drawn downwardly at an angle with respect to the vertical thereby giving a presentation which is a modified isometric view of the volume of the water body being scanned.

Referring now to Fig. 6, there is illustrated a presentation on sensitized paper which would appear in the window of the indicator if the paper 44 were drawn downwardly at a small angle, for example, 15 degrees with respect to the perpendicular. Thus the zero echo marks would lie on a line extending from the middle of the upper edge of the paper downwardly at a 15 degree angle with respect to vertical and would pass below the lower edge of the presentation closer to one edge, for example, to the left-hand edge, than to the right-hand edge. The distance of the echo signals from the vessel are measured back to their respective zero marks similar to that of Fig. 5, and the angle of the object producing the echo with respect to vertical is the angle between the line of zero marks and the line of the echo mark. The paper is moved downwardly past the window so time or distance behind the vessel is measured downwardly from the top of the paper to the particular zero mark made by the transmitted signal producing the particular echo. Presentation of Fig. 6 contains all the information presented in the Fig. 5 display, but gives an appearance somewhat similar to a perspective view of a solid, and, therefore, is helpful in some instances to more clearly illustrate particular contour details and the relationships of the various objects within the water volume illustrated by the presentation.

Figure 7:
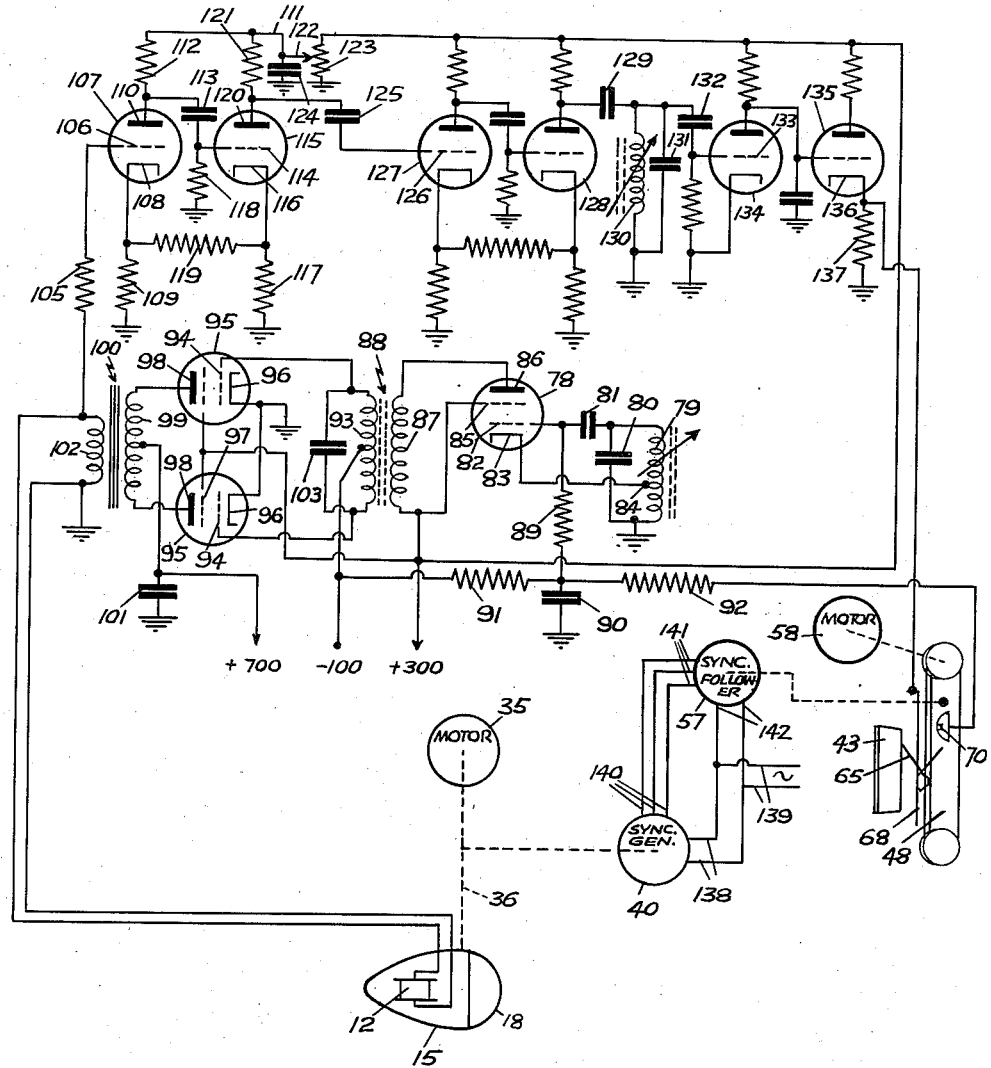
Fig. 7 illustrates a schematic diagram of the electrical system which may be used in the device illustrated in Figs. 1 through 6.

Referring now to Fig. 7, there is illustrated a schematic diagram of a circuit which may be used in the invention described in connection with Figs. 1 through 6. There is provided an oscillator tube 78 which is used in a Hartley oscillator circuit utilizing an inductor 79 and a capacitor 80 in parallel, forming a resonant tank circuit at the desired transmitter frequency. This frequency may be, for example, in the supersonic range. One end of inductor 79 is grounded and the other end thereof is connected through a coupling condenser 81 to the grid 82 of tube 78. The cathode 83 of tube 78 is connected to a tap 84 on inductor 79, thereby producing a regenerative feedback. The screen grid 85 of tube 78 is connected to a positive potential of, for example, three hundred volts and the plate 86 of tube 78 is connected through the primary winding 87 of a transformer 88 to a three-hundred volt positive potential source. The grid 82 is connected through a grid load resistor 89 and an RF bypass condenser 90 in series to ground. The junction between resistor 89 and condenser 90 is connected through a current-limiting resistor 91 to a source of negative potential of, for example, one hundred volts and through a current-limiting resistor 92 to the keying contact 70 on the movable stylus carrying arm 48.

When the stylus 65 passes the keying contact 70, it connects a positive voltage from the output of the receiver through resistor 92, thereby driving the grid 82 of the tube 78 up out of cut-off and allowing tube 78 and its associated circuitry to oscillate at the resonant frequency of the tank circuit 79 and 80 for the duration of the time that stylus assembly 65 and contact 70 touch. The result is a short burst of oscillations every time the stylus 65 passes the upper edge of the platen 43, at which time it contacts the keying contact 70. The output of the oscillator tube 78 is fed through transformer 88 to the secondary winding 93 thereof. Secondary winding 93 has a center tap connected to the negative potential source and the ends thereof connected, respectively, to the control grids 94 of a pair of push-pull driver tubes 95 which amplify the power of the oscillations produced by oscillator tube 78. The cathodes 96 of tubes 95 are connected to ground and the screen grids 97 thereof are connected to the three hundred volt B+. The anodes 98 of tubes 95 are connected to the ends of a primary winding 99 of an output transformer 100. The center tap of winding 99 is connected to ground through an RF bypass condenser 101 and to an additional high voltage source of, for example, 700 volts. The tubes 95 and 78 may be pentodes but the suppressor grids connected to the cathode have been omitted from the drawings in the interest of clarity.

Secondary winding 102 of transformer 100 is connected to the transducer 12 illustrated in Fig. 1. Hence the pulse of energy generated by oscillator 78 is converted into sonic energy and emitted into the water body. One or both of the transformers 88 and 100 may be resonated at the oscillation frequency of tube 78 and the transducer 12 is normally resonant to this oscillation frequency. For example, as shown here, the secondary winding 93 of transformer 88 has a condenser 103 in parallel therewith which resonates winding 93 to the oscillation frequency of tube 78.

Reflected echo signals are picked up by the transducer 12 and appear across transformer winding 102. One end of winding 102 is connected to ground and the other end thereof is connected through a resistor 105 to the grid 106 of a triode 107. The cathode 108 of triode 107 is connected to ground through a cathode bias resistor 109 and the plate 110 thereof is connected to a variable B+ voltage bus 111 through a plate load resistor 112. Plate 110 is also connected through a coupling condenser 113 to the grid 114 of a triode 115 whose cathode 116 is connected to ground through a cathode bias resistor 117. Grid 114 is also connected to ground through grid load resistor 118. Cathodes 108 and 116 are connected together through a resistor 119 which feeds a small portion of the signal appearing at cathode 116 back to cathode 108, thereby partially compensating for the degenerative effect of unbypassed cathode bias resistor 109. The plate 120 of triode 115 is connected to the variable voltage bus 111 through a plate load resistor 121. The variable voltage bus 111 is supplied by means of a tap 122 of a potentiometer 123 connected between the three hundred volt B+ supply and ground. Bus 111 is connected to ground through a filter condenser 124. Adjustment of tap 122 adjusts the voltage of bus 111 and thereby adjusts the amplification of tubes 107 and 115, thereby adjusting the gain of the receiver.

Anode 120 is connected through a coupling condenser 125 to the grid 126 of a triode 127 which, together with a triode 128, form an additional pair of amplifying stages connected in identical fashion to that described in connection with tubes 107 and 115, except that the plate load resistors are connected to the B+ supply voltage of three hundred volts rather than the variable voltage bus 111. The output of amplifier tube 128 is obtained from the anode thereof and is fed through a coupling condenser 129 to a tank circuit comprising an inductor 130 and condenser 131 in parallel, one end of said tank circuit being connected to the coupling condenser 129 and the other end thereof being connected to ground. The coupling condenser 129 also feeds through a coupling condenser 132 to the grid 133 of a grid-leak detector triode 134, the output of which feeds a cathode follower 135. The circuitry for grid-leak detector 134 and cathode follower 135 is similar to that disclosed in greater detail in my aforementioned copending application. The output of cathode follower 135 appears at cathode 136 thereof across cathode load resistor 137. This output is fed to the track 68 by connecting the cathode 136 through the required slip rings 71 and brush 72, which are omitted from Fig. 7 in the interest of clarity.

The keying system operates in a manner similar to that described in my aforementioned copending application and the returned echo signals are fed back through the receiver utilizing amplifier tubes 107, 115, 127 and 128, detector 134 and cathode follower 135 to apply the echo signals through the track 68 to the stylus 65, thereby producing a mark on the sensitized paper 44 passing across plate 43. To train the transducer, there is shown motor 35 connected through suitable cam and gearing arrangement, as illustrated in Fig. 1, and, as indicated in Fig. 7, by the dotted line 36 to the transducer housing portion 15, which is rotatable. The motion of housing 15 produces a corresponding rotation of the rotor of synchro generator 40 whose rotor leads 138 are connected to an alternating current source 139. The stator leads 140 of synchro generator 40 are connected to the corresponding stator leads 141 of synchro follower 57. The rotor leads 142 of synchro follower 57 are connected to the same alternating current voltage source 139 as the rotor leads 138 of synchro generator 40. The motors 35 and 58 are preferably energized from the alternating current source, but other sources, such as a direct current source, could be used.

The rate at which the transducer is trained through its vertical angle may be any desired rate. However, for good efficiency of search, the rate should be so adjusted that the regions of the volumes searched overlap somewhat. For example, if the maximum beam width of the transducer at a depth of 600 ft. is 180 ft., and the 600 ft. level is the level of greatest interest, then the transducer should go through one complete training cycle every time the vessel has moved forward 180 ft. Thus if the vessel speed were slightly less than two miles per hour, or 180 ft. per minute, the transducer would train through the complete cycle once every minute. If the distance of travel of the stylus completely across the platen 43 represented a range, for example of 1000 ft., and this is approximately thirty percent of the total distance which the stylus travels around the pulleys and along each side of the arm, the keying rate for the system could be approximately one pulse per second; that is, the stylus would travel down across the paper once every second or sixty times during every complete training cycle of the transducer. If desired, three equally spaced styli could be used thereby tripling the keying rate.

If it is desired to use the equipment to search shallower depths, the keying rate could be made more rapid, and, since the beam width at the shallower depths would be less, the training rate of the transducer would be increased. If it is desired to search at a greater vessel speed, the training rate of the transducer should also be increased. It should be clearly understood that the degree of overlap of the search pattern may be adjusted by adjustment of vessel speed and training rate to obtain any desired percentage of coverage of the total water body being searched. If desired, the training rate may be decreased, or the vessel speed increased, while holding other variables constant, whereupon the degree of overlap will be decreased and areas in between the searched areas will not be searched; in other words, the search process will become a sampling process. It should also be understood that the type of sweep of the transducer through the vertical angle may be varied by varying the contour of the cam and any desired training rate or variation thereof may be used. For example, a sinusoidal training rate could be used, if so desired.

Figure 8:
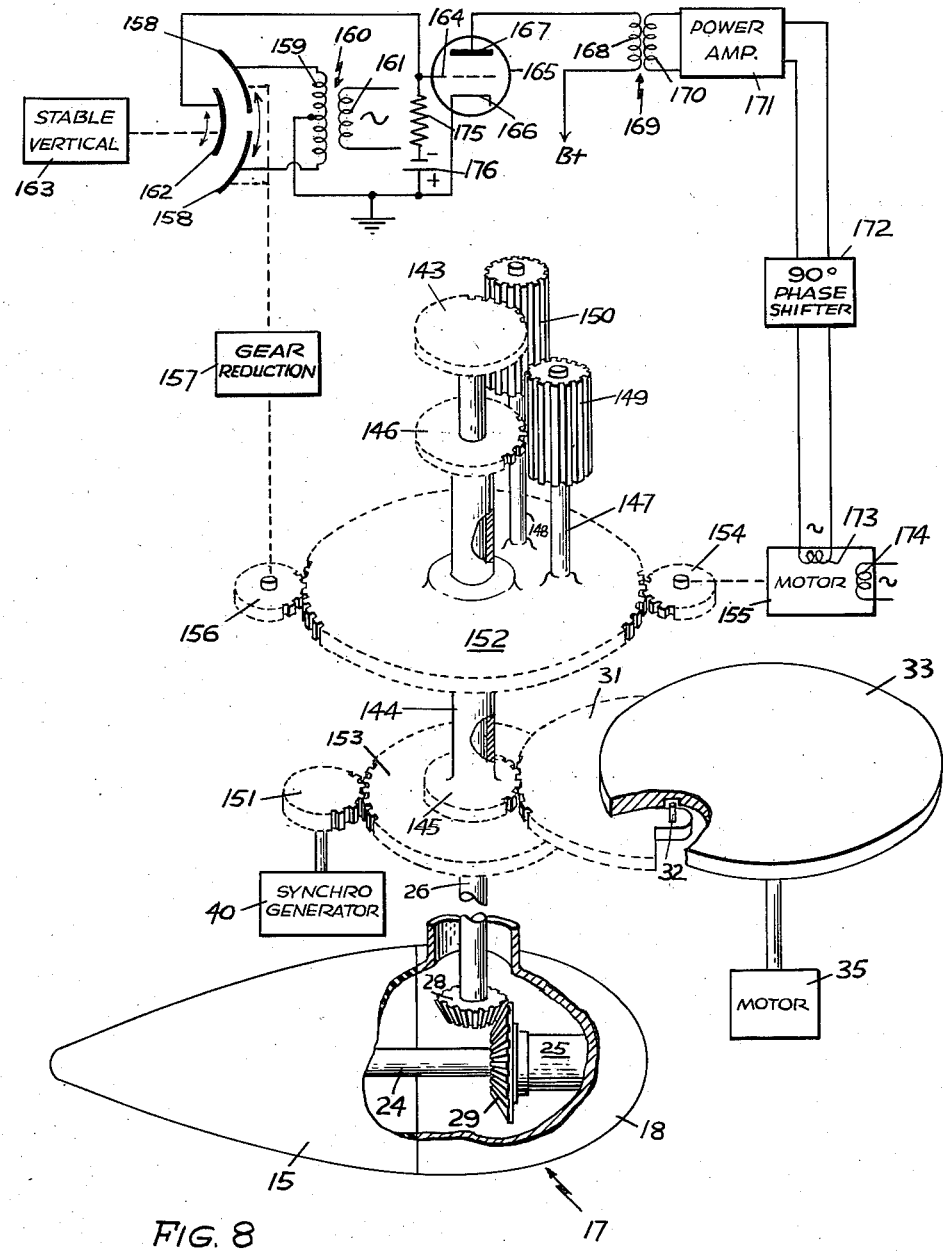
Fig. 8 illustrates diagrammatically a system which may be used in the device illustrated in Figs. 1 through 7 to compensate for roll of the vessel.

Referring now to Fig. 8, there is shown a modification of the training mechanism illustrated in Figs. 1 and 2, wherein provision is made to maintain the orientation of the transducer independent of rolling of the vessel. The casing member, 15 containing the transducer, the shaft 24, the bevel gears 28 and 29, and the transducer housing assembly 17 are identical with that shown in Fig. 1. The gearing for driving the shaft 26 which drives bevel gear 28 has, however, been changed. The shaft 26 has attached thereto a spur gear 143. Bearing on shaft 26 is a coaxial shaft 144. Attached to the lower end of shaft 144 is a pinion gear 145 and attached to the upper end of shaft 144 is a spur gear 146. Coaxially with, and bearing on, shaft 144 is a spur gear 152. Spur gear 152 carries thereon a shaft 147 rigidly fixed thereto, parallel to the axes of shafts 26 and 144, but radially spaced on gear 152 from said shafts. Shaft 147 carries a pinion gear 149 rotatable thereon which meshes with spur gear 146. Spur gear 152 carries a second shaft 148 on which rotates a pinion gear 150 which meshes with spur gear 143 and pinion gear 149. Pinion gear 150 is the same size as pinion gear 149, and spur gear 146 is the same size as spur gear 143. Attached to the lower edge of pinion gear 145 is a spur gear 153 coaxial therewith. Meshing with spur gear 153 is a pinion gear 151 which is rigidly attached to the rotor of synchro generator 40 to transmit the true motion, of the transducer in housing 15 with respect to vertical, to the indicator. Meshing with pinion gear 145 is the partial spur gear 31 similar to that illustrated in Fig. 1 which carries the follower 32 which rides in a groove in cam 33 driven by motor 35.

Meshing with spur gear 152 is a pinion gear 154 driven by a two-phase motor 155. Also meshing with spur gear 152 is a pinion gear 156 which is connected through a gear reduction system 157 to a pair of plates 158. Plates 158 are electrically connected, respectively, to the ends of a secondary winding 159 of a transformer 160. Winding 159 has a center tap which is connected to ground. The primary winding 161 of transformer 160 is connected to a source of alternating voltage.

Spaced from plates 158 is a plate 162 which is mechanically connected to a stable vertical 163. Stable vertical 163 may be, for example, a gyroscope, or even a pendulum, the purpose of the stable vertical being to maintain the plate 162 oriented in a position indicative of the true vertical, independent of the roll of the vessel. For example, if the stable vertical is a pendulum comprising a weight at the end of a rod, the plate 162 could be carried on a shaft acting as a pivot for the rod and to which the rod was rigidly fastened. Thus, as the ship rolled, the pendulum would swing about its pivot shaft, which should be oriented with the axis thereof fore and aft, thus causing the plate 162 to rotate with respect to the vessel as the vessel rolls, but having substantially no rotation with respect to true vertical. The plates 158 would then be carried by a shaft coaxially rotatable with respect to the pendulum pivot shaft and driven by the output of the gear reduction system 157.

The plate 162 is electrically connected to the grid 164 of an amplifier tube 165 whose cathode 166 is grounded and whose anode 167 is connected through the primary winding 168 of the transformer 169 to B+. The secondary winding 170 of transformer 169 is connected to the input of the power amplifier 171, the output of which is connected through a 90-degree phase shifter 172 to one winding 173 of two-phase motor 155. The other winding 174 of motor 155 is connected to the same alternating current source as is transformer winding 161. The result of this system is to cause the condenser plates 158 to be spaced equally on either side of plate 152, since, if one of the plates 158 is closer to the plate 162 than the other, the signal strengths coupled to plate 162 will not balance out, since the plate 158, which is closer, will couple a stronger signal than the plate which is farther away. This resultant signal is amplified by tube 165 and fed to the motor 155 driving through gears 154, 152, 156 and 157 in the proper direction to center the plates 158 equally on either side of the plate 162. For bias purposes, the grid 164 of amplifier 165 may be returned through a grid load resistor 175 and a bias battery 176 to ground.

In operation, if the vessel is not rolling, the gear 152 will be stationary. In this event, motor 35 drives cam 33, thereby causing oscillatory motion of the gear 31 similar to that described in connection with Fig. 1. This motion is transferred through pinion gear 145 and shaft 144 and gears 146, 149, shaft 148 and gears 150 and 143 to shaft 26, which moves shaft 24 through bevel gears 28 and 29, thereby causing the desired oscillation of the transducer head. The gear ratios and relative gear sizes are illustrated herein by way of example only, and any desired gear ratios could be utilized. In general, the cam contour is such that, for the gear ratios of the train driving from gear 31 through to the shaft 24 and the transducer 12, one rotation of cam 33 rotates the transducer, from a direction of orientation of the pattern substantially abeam the vessel, vertically downward, and back up to a position of abeam the vessel on the other side, utilizing a major portion of the cam cycle. It then returns to its starting position through the minor portion of the cam cycle.

The direction of orientation of the transducer may be held in any desired position, or be made to move through any desired training cycle, dependent on the contour of cam 33, independent of roll of the vessel, by applying correcting motion for the roll of the vessel to gear 152. For example, if the transducer is in that portion of its training cycle where it is directed vertically downward, and the vessel starts to roll toward either side, the plate 162 will rotate with respect to the vessel, and, due to the servo loop action utilizing amplifiers 165, 171, motor 155 and gearing 154, 152, 156 and 157, the plates 158 will follow the plate 162 in its rotation. The result will be a rotation of gear 152. The magnitude of the rotation of gear 152 will be directly proportional to the magnitude of the roll of the vessel. Rotation of gear 152 causes rotation of shaft 147 about shaft 144, thereby producing rotation of gear 143 in addition or subtraction. The result is that shaft 24 is rotated in the opposite direction to the roll of the vessel and by the same amount thereby compensating for the roll of the vessel. The gear ratios of the gears 154, 152, 156 and 157, as well as gear ratios or gears 146, 149, 143 and 150, are adjusted such that rotation of plate 162, with respect to the vessel, produces the same amount of rotation of shaft 24 in the same direction with respect to the vessel. Thus, it may be seen that the transducer head 12 may be directed through any desired cycle of orientations of the sonic pattern bearing a predetermined relationship to true vertical independent of the roll of the vessel.

This completes the description of the embodiments of the invention illustrated herein. However, many modifications thereof will be apparent to persons skilled in the art without departing from the spirit and scope of this invention. For example, the plane through which the transducer 12 trains need not be exactly vertical, but may be slanted either fore and aft the vessel, if so desired, and, indeed, this slant may be made adjustable either manually or automatically. Other recorders may be used with the training system illustrated in Figs. 1 and 8. For example, vessel records utilizing flashing lights could be used rather than the permanent record type of recorder disclosed herein, and other types of training systems could be used with the recorder illustrated herein. Accordingly, it is desired that this invention be not limited by the particular details of the species of the invention disclosed herein, except as defined by the appended claims.

What is claimed is:

1. An echo ranging system comprising directional energy radiation apparatus, moving means for cyclically varying the direction of radiation of said apparatus and an indicator fed by said apparatus comprising a recording medium, said moving means cyclically varying said apparatus through a range of declination angles from a maximum in a first direction through a minimum and to a maximum in a second direction for producing a sweep of signals having a fixed azimuth that varies in declination angles only, said declination angles being measured with respect to a vertical position, a record producing element movable in a single direction, said element being supported by a support structure having a drive motor mounted thereon for cyclically drawing said element across said medium along a substantially linear path, and a structure for rotating said support structure with respect to said medium about a predetermined point.

2. An echo ranging system comprising directional energy radiation apparatus, moving means for cyclically varying the direction of radiation of said apparatus and an indicator fed by said apparatus comprising a recording medium, said moving means cyclically varying said apparatus through a range of declination angles from a maximum in a first direction through a minimum and to a maximum in a second direction for producing a sweep of signals having a fixed azimuth that varies in declination angles only, said declination angles being measured with respect to a vertical position, a record producing element movable in a single direction, said element being supported by a support structure having a drive motor mounted thereon for cyclically drawing said element across said medium along a substantially linear path, a structure for rotating said support structure with respect to said medium about a predetermined point, and means for correlating the rotational position of said path with the direction of radiation of said apparatus.

3. An echo ranging system comprising directional energy radiating apparatus, moving means for cyclically varying the direction of radiation of said apparatus and an indicator fed by said apparatus comprising a recording medium, said moving means cyclically varying said apparatus through a range of declination angles from a maximum in a first direction through a minimum and to a maximum in a second direction for producing a sweep of signals having a fixed azimuth that varies in declination angles only, said declination angles being measured with respect to a vertical position, a record producing element movable in a single direction, said element being moved by an endless belt having a support structure for cyclically drawing said element across said medium along a substantially linear path, a structure for rotating said path with respect to said medium about a predetermined point, means for correlating the rotational position of said path with the direction of radiation of said apparatus, and means of maintaining the desired orientation of said radiating apparatus independent of movement of said system.

4. An echo ranging system comprising directional energy radiation apparatus, moving means for cyclically varying the direction of radiation of said apparatus and an indicator fed by said apparatus comprising a recording medium, said moving means cyclically varying said apparatus through a range of declination angles from a maximum in a first direction through a minimum and to a maximum in a second direction for producing a sweep of signals having a fixed azimuth that varies in declination angles only, said declination angles being measured with respect to a vertical position, a record producing element movable in a single direction, said element being moved by an endless belt having a support structure for cyclically drawing said element across said medium along a substantially linear path, a structure for rotating said path with respect to said medium about a predetermined point, means for correlating the rotation of said path with the direction of radiation of said apparatus, and means for maintaining the desired orientation of said radiating apparatus independent of movement of said system.

5. An echo ranging system comprising directional energy radiation apparatus, moving means for cyclically varying the direction of radiation of said apparatus and an indicator fed by said apparatus comprising a recording medium, said moving means cyclically varying said apparatus through a range of declination angles from a maximum in a first direction through a minimum and to a maximum in a second direction for producing a sweep of signals having a fixed azimuth that varies in declination angles only, said declination angles being measured with respect to a vertical position, a record producing element movable in a single direction, said element being moved by an endless belt having a support structure for cyclically drawing said element across said medium along a substantially linear path, a structure for rotating said path with respect to said medium about a predetermined point, a structure for moving said medium with respect to said point, and means for correlating the rotational position of said path with the direction of radiation of said apparatus.

6. An echo ranging system comprising directional energy radiation apparatus, moving means for cyclically varying the direction of radiation of said apparatus and an indicator fed by said apparatus comprising a recording medium, said moving means cyclically varying said apparatus through a range of declination angles from a maximum in a first direction through a minimum and to a maximum in a second direction for producing a sweep of signals having a fixed azimuth that varies in declination angles only, said declination angles being measured with respect to a vertical position, a record producing element movable in a single direction, said element being moved by an endless belt having a support structure for cyclically drawing said element across said medium along a substantially linear path, a structure for rotating said path with respect to said medium about a predetermined point, a structure for moving said medium with respect to said point, means for correlating the rotational position of said path with the direction of radiation of said apparatus, and means of maintaining the desired orientation of said radiating apparatus independent of movement of said system.

References Cited in the file of this patent

UNITED STATES PATENTS

| 2,406,861 | Springer | Sept. 3, 1946 |
| 2,407,697 | Williams | Sept. 17, 1946 |
| 2,475,363 | Turner | July 5, 1949 |
| 2,595,241 | Goble | May 6, 1952 |
| 2,759,873 | Ross | Aug. 21, 1956 |